United States Patent
Meilik et al.

(10) Patent No.: US 8,982,710 B2
(45) Date of Patent: Mar. 17, 2015

(54) ETHERNET OPERATION AND MAINTENANCE (OAM) WITH FLEXIBLE FORWARDING

(71) Applicant: Broadcom Corporation, Irvine, CA (US)

(72) Inventors: Israel Meilik, Haifa (IL); Yoram Stern, Ra'anana (IL)

(73) Assignee: Broadcom Corporation, Irvine, CA (US)

( * ) Notice: Subject to any disclaimer, the term of this patent is extended or adjusted under 35 U.S.C. 154(b) by 142 days.

(21) Appl. No.: 13/631,145

(22) Filed: Sep. 28, 2012

(65) Prior Publication Data

US 2014/0092751 A1    Apr. 3, 2014

(51) Int. Cl.
 *H04L 12/26* (2006.01)
 *H04L 12/24* (2006.01)

(52) U.S. Cl.
 CPC ........ *H04L 43/0811* (2013.01); *H04L 41/0213* (2013.01); *H04L 41/0659* (2013.01); *H04L 43/10* (2013.01)
 USPC .......................... 370/241.1; 370/242; 370/248

(58) Field of Classification Search
 None
 See application file for complete search history.

(56) References Cited

U.S. PATENT DOCUMENTS

| | | | | |
|---|---|---|---|---|
| 5,903,559 | A * | 5/1999 | Acharya et al. | 370/355 |
| 6,069,895 | A * | 5/2000 | Ayandeh | 370/399 |
| 6,850,520 | B1 * | 2/2005 | Takada et al. | 370/389 |
| 8,385,353 | B2 * | 2/2013 | Salam et al. | 370/395.53 |
| 2001/0009549 | A1 * | 7/2001 | Aznar et al. | 370/393 |
| 2007/0097857 | A1 * | 5/2007 | Zhai | 370/218 |
| 2007/0133564 | A1 * | 6/2007 | Chun et al. | 370/395.51 |
| 2008/0144657 | A1 * | 6/2008 | Li | 370/466 |
| 2009/0238084 | A1 * | 9/2009 | Nadeau et al. | 370/248 |
| 2010/0061252 | A1 * | 3/2010 | Kini et al. | 370/248 |
| 2010/0278048 | A1 * | 11/2010 | Sawaguchi | 370/241.1 |
| 2010/0316103 | A1 * | 12/2010 | Schoppmeier | 375/222 |
| 2011/0080836 | A1 * | 4/2011 | Bragg et al. | 370/241.1 |
| 2011/0116384 | A1 * | 5/2011 | Kotrla et al. | 370/241.1 |
| 2011/0116385 | A1 * | 5/2011 | Turlington et al. | 370/242 |
| 2011/0211827 | A1 * | 9/2011 | Soto et al. | 398/25 |
| 2012/0020206 | A1 * | 1/2012 | Busi et al. | 370/217 |
| 2012/0120955 | A1 * | 5/2012 | Vissers et al. | 370/392 |
| 2012/0163189 | A1 * | 6/2012 | Allan et al. | 370/241.1 |
| 2012/0230207 | A1 * | 9/2012 | Stern et al. | 370/248 |
| 2013/0054565 | A1 * | 2/2013 | O'Connell et al. | 707/711 |
| 2014/0016926 | A1 * | 1/2014 | Soto et al. | 398/16 |
| 2014/0025794 | A1 * | 1/2014 | Bartholomay et al. | 709/221 |
| 2014/0092751 | A1 * | 4/2014 | Meilik et al. | 370/241.1 |

* cited by examiner

*Primary Examiner* — Bunjob Jaroenchonwanit
(74) *Attorney, Agent, or Firm* — Sterne, Kessler, Goldstein & Fox P.L.L.C.

(57) ABSTRACT

Methods, systems, and computer readable media for transmitting an OAM packet from a source network device to a destination network device are disclosed. They include generating an OAM protocol data unit (PDU) at the source network device, injecting the OAM PDU in an ingress packet processing pipeline, determining an egress interface of the source network device through which to transmit the OAM PDU to the destination network device, encapsulating the OAM PDU in one or more protocol headers in an egress packet processing pipeline, and transmitting the encapsulated OAM PDU from the egress interface as the OAM packet. The injected OAM PDU is associated with an indication to bypass at least a portion of ingress packet processing.

20 Claims, 7 Drawing Sheets

Special/TM header
  431

ETHERNET OPERATION AND MAINTENANCE (OAM) WITH FLEXIBLE FORWARDING

BACKGROUND

1. Field of the Invention

Embodiments of this invention are related to packet processing devices.

2. Background Art

Ethernet, which was initially a local area network (LAN) technology in relatively small geographic areas, has evolved to become the default data link layer (i.e. layer 2 of the Open System Interconnection (OSI) protocol model) protocol for data transport. Over time, Ethernet was extended beyond the customer LAN across provider (carrier) networks. As Ethernet evolved as a carrier grade technology, accompanying operations, administration and maintenance (OAM) frameworks have been developed to support aspects such as high levels of resiliency and ease of deployment. Several standards, including IEEE 802.1ag have been adopted by equipment manufacturers, carriers, and service providers.

IEEE 802.1ag Ethernet Connectivity Fault Management (CFM) is an OAM standard used to perform fault detection, isolation, and verification on virtual bridge LANs. It defines protocols and practices for OAM for paths through 802.3 bridges and local area networks (LANs). For example, CFM defines protocols to manage geographically-dispersed customer networks that are interconnected through provider bridged networks.

IEEE 802.1ag standard defines maintenance domains (MD), maintenance associations (MA), maintenance end points (MEP), and maintenance intermediate points (MIP). MDs are management spaces in a network, typically owned and operated by a single entity. Example MDs are operator domain, provider domain, and customer domain. Each maintenance domain is assigned a unique level number ranging from 0 to 7.

MEP is a point at the edge of the MD, and defines the boundary for the MD. CFM operates at the connectivity layer of OAM monitoring paths between non-adjacent devices in an MD. A MEP sends and receives CFM frames through the relay function, drops all CFM frames of its level or lower that come from the wire side. A MIP is a point internal to a domain, not at the boundary. CFM frames received from MEPs and other MIPs are cataloged and forwarded, all CFM frames at a lower level are stopped and dropped. An MA is a set of MEPs, all of which are configured with the same MAID (Maintenance Association Identifier) and MD Level. FIG. 1 illustrates the Ethernet OAM domains and levels.

FIG. 1 illustrates a network layout 100 between customer networks 101 and 103. A router 102 in customer network 101 and a router 104 in customer network 103 are in a MA in a customer level MD. Routers 102 and 104 are each an MEP at the customer level. Routers 102 and 104 are coupled to routers 106 and 108, respectively, of operator networks 105 and 107. Operator networks 105 and 107 are coupled through core network 111 by routers 110 and 112, facilitating the end-to-end connection from 102 to 104.

In order to facilitate connecting geographically dispersed customer networks 101 and 103 which are Ethernet networks, the provider may implement a technology such as, but not limited to, Multiprotocol Label Switching (MPLS)/Internet Protocol (IP) or Virtual Private LAN Service (VPLS) which encapsulate the customer Ethernet packets over the provider networks. This encapsulating network may extend from the edge of one customer network to another (e.g. operator-facing edge of network 101 to the operator-facing edge of network 103).

Based upon this network layout, a provider level MD extends from the customer-side interface of router 106. The outer (e.g. customer network facing) interfaces of routers 106 and 108 are each an MEP at the provider level. Operator level MDs are between non-provider interfaces of the router pair 106-110 and 108-112. Customer level MIPs can be located in customer-network facing interfaces of routers 106 and 108. Provider level MIPs can be located in core network facing interfaces of routers 110 and 112, and operator level MIPs can be located in operator network facing interfaces of routers 106, 108, 110, and 112.

FIG. 2 illustrates a network 200 having network devices (e.g. routers, bridges, switches, hubs) A 202, B 204, C 206, D 208, and E 210. Routers A 202 and E 210 have MEPs at the same level belonging to the same MA. When network 200 is fully operational, the MEP in A 202 may communicate with the MEP in E 210 by transmitting OAM packets out of A 202 through the interface coupled to D 208, and then packet is forwarded by D 208 to destination MEP at E 210. Messages such as keep alive messages (also referred to as Continuity Check Messages or CCM), may be sent from the customer level MEP at A 202 to destination MEP at E 210. OAM messages such as CCM may be locally generated by an OAM client.

If the path A-D-E fails, for example, because D 208 has failed, the data traffic other than OAM traffic between A and E may continue by transiting through a new route such as through B 204 and C 206. The data traffic other than OAM traffic, which can be referred to as "routed traffic" relatively quickly adapts to a new route to E 210 because a routing protocol (e.g. Border Gateway Protocol (BGP), Open Shortest Path First (OSPF)) would update the routing table (also referred to herein as "forwarding table") at A 202, where the routed packets rely upon the routing table in order to determine the interface through which to exit the router (i.e. "egress interface").

OAM packets which are locally generated, however, are injected into an egress packet processing pipeline below the network layer and rely upon an MEP database to determine the egress interface. The MEP database is a database dedicated for OAM use. The MEP database is updated based upon received CCM that are received on an interface.

Because these locally generated OAM packets rely upon the MEP database to determine the egress interface, and because the MEP database may not be updated as quickly as the routing table, the OAM packets may continue to use the failed route to the destination MEP (e.g. E 210) and incorrectly report failure of the destination MEP as well as fail to protect the actual path (in this case, the new path through B 204 and C 206 to E 210) through which the routed traffic reached E 210.

BRIEF SUMMARY

Embodiments are directed to improving conventional OAM operations by ensuring OAM packets, such as, for example, Ethernet OAM packets exchanged between MEP down entities (e.g. MEPs protecting a network between two network devices) in a MA, are forwarded using the latest reachability information. Embodiments improve upon the conventional OAM operations by, for example, more quickly and flexibly protecting the traffic paths when a change in a path between MEP down entities occur. Further, false alarms, caused by incorrect detection of a network device failure, are reduced during network reachability changes.

Methods, systems, and computer readable media for transmitting an OAM packet from a source network device to a destination network device are disclosed. They include generating an OAM protocol data unit (PDU) at the source network device, injecting the OAM PDU in an ingress packet processing pipeline, determining an egress interface of the source network device through which to transmit the OAM PDU to the destination network device, encapsulating the OAM PDU in one or more protocol headers in an egress packet processing pipeline, and transmitting the encapsulated OAM PDU from the egress interface as the OAM packet. The injected OAM PDU is associated with an indication to bypass at least a portion of ingress packet processing.

Further features and advantages of the present disclosure, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

While the present disclosure is described herein with reference to illustrative embodiments for particular applications, it should be understood that the disclosure is not limited thereto. Those skilled in the art with access to the teachings herein will recognize additional modifications, applications, and embodiments within the scope thereof and additional fields in which the disclosure would be of significant utility.

Embodiments provide for transmitting OAM packets in a manner that is highly responsive to the dynamic topology and reachability changes between two management entities in a network. For example, CCM is injected below the network layer at MEP down entities, so as to be transmitted over the same network paths that are taken by routed traffic.

Figure 1:
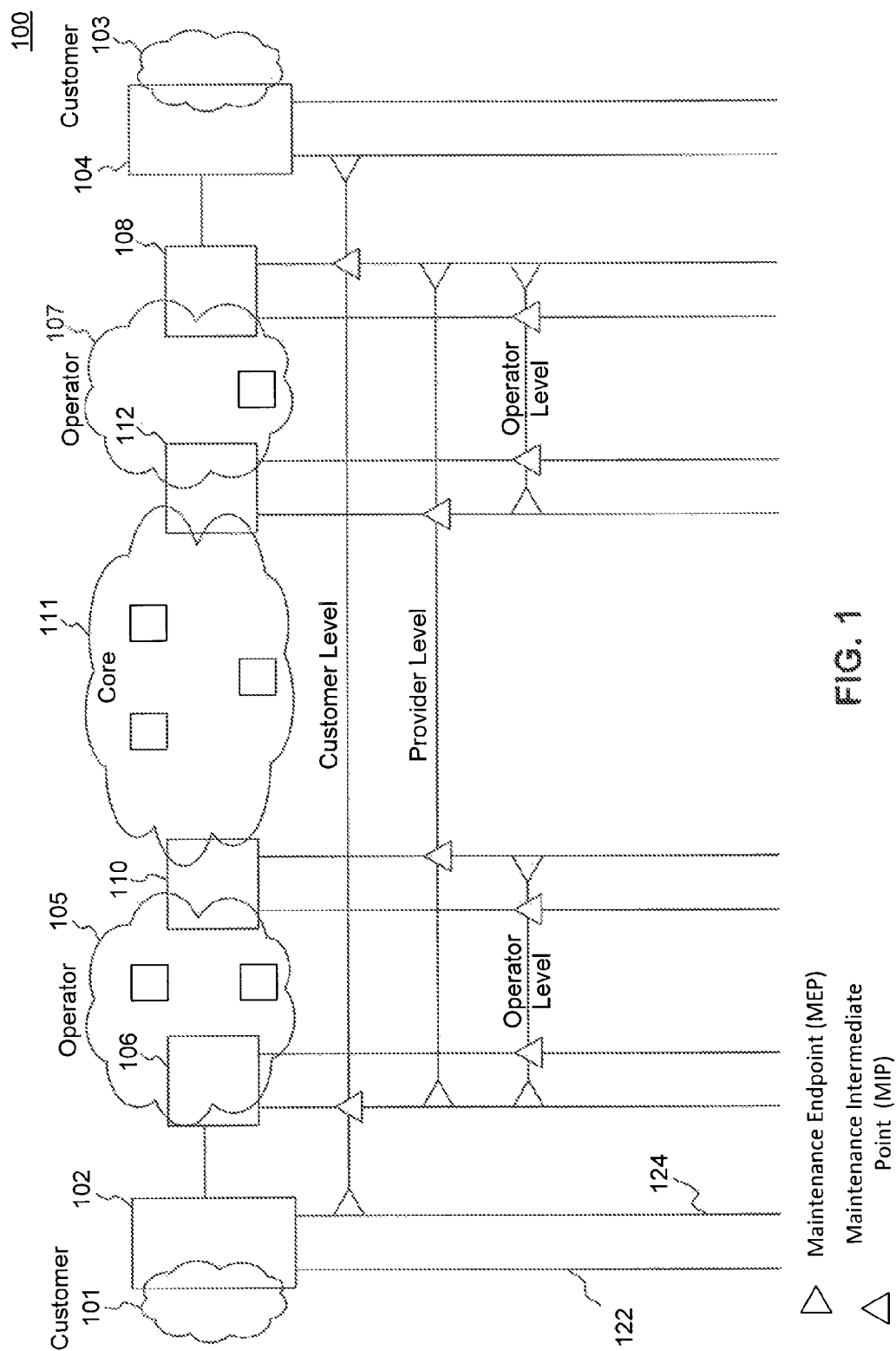
FIG. 1 illustrates an exemplary network diagram showing OAM entities in network devices.
Figure 2:
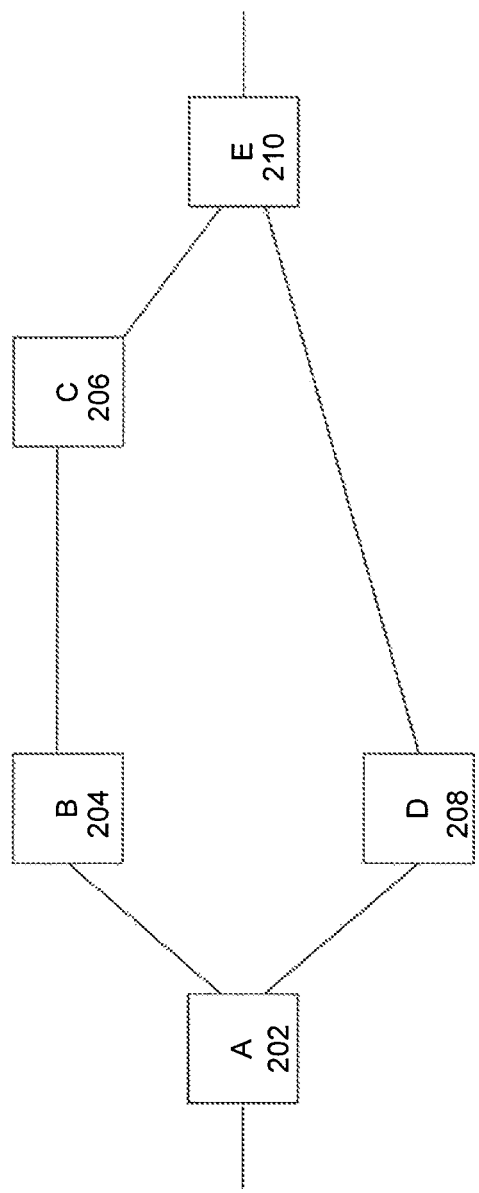
FIG. 2 illustrates a network diagram illustrating two alternate paths between OAM entities.
Figure 3:
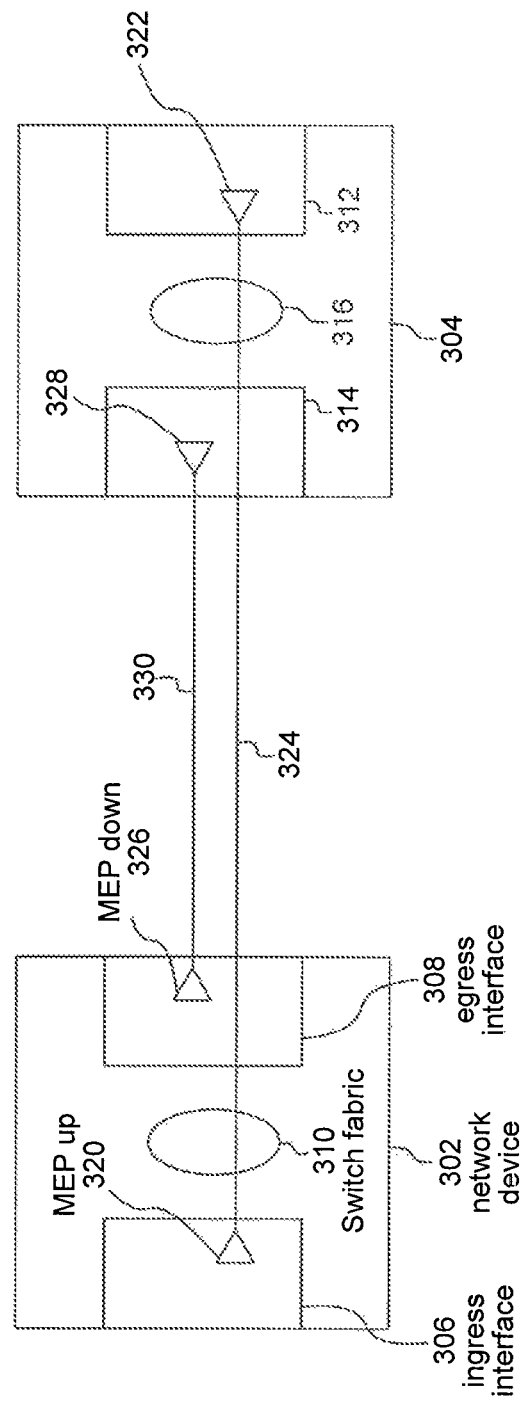
FIG. 3 illustrates OAM entities, MEP up and MEP down in network devices.

FIG. 3 illustrates OAM entities, "MEP up" and "MEP down" in network devices. Each MEP up entity monitors the path between itself and another MEP, and the monitored path (e.g. 324 in FIG. 3, below) includes the packet forwarding and relay functions in the two entities. Each MEP down entity also monitors the path between itself and another MEP, but the monitored path (e.g. 330 in FIG. 3, below) extends from the egress interface of one MEP down entity to the egress interface of the other MEP down entity. Network device 300 may be a router, bridge, switch, hub or other packet/frame forwarding entity at the edge of a network, such as any of devices 102, 104, 106, 108, 110 and 112 in FIG. 1. Network device 300 has at least one interface at the edge of the network in which it is located. For example, customer router 102 includes an internal interface 122 and an edge interface 124. Edge interface 124 couples customer router 102 and its network 101 to operator network 105. As noted above, MEPs provides for OAM over a MA in a single MD. A service instance or MA can span more than one interconnected provider bridged network in order to represent a service to a customer. A unique virtual LAN identifier (VLAN ID) identifies each MA over the network.

The IEEE 802.1ag defines two MEP entities: MEP up is designed to manage the connection between two MEP entities, where the connection includes the path within each of the network devices hosting the respective MEPs. For example, an MEP up managed connection 324 includes the path between an MEP up 320 in an ingress interface 306 of network device 302 and an MEP up 322 in an ingress interface 312 of network device 304. The MEP up path 324 includes ingress interfaces 320 and 322, the switching fabrics 310 and 316, egress interfaces 308 and 314, and the intervening network path between network devices 302 and 304. This also includes the protocol processing, including network layer protocol processing, that is performed in forwarding routed packets through by a network device.

The MEP down managed connection 330 extends between an MEP down entity 326 in egress interface 308 of network device 302 and MEP down entity 328 in egress interface 314 of network device 304. In contrast to the MEP up association 324, the MEP down association 330 concerns the network between the edges of two selected network devices, and in particular, does not concern the switching fabrics of the respective network devices. The MEP down association, as described below, does not concern network layer packet processing at the respective network devices having the MEPs.

Figure 4A:
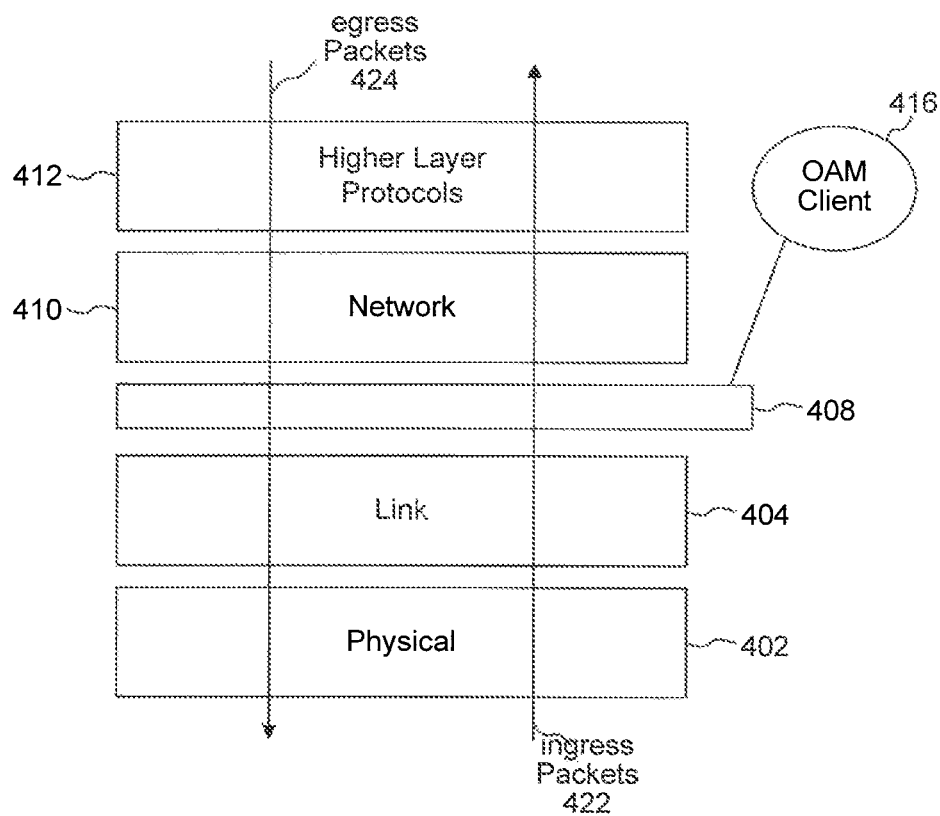
FIG. 4A illustrates a layered network packet processing logic stack, in accordance with an embodiment.

FIG. 4A illustrates a layered network packet processing logic stack including facilities for processing Ethernet OAM protocol packets. Network packet processing logic stack 400 represents the general sequence of operations applied to packet processing in an Ethernet OAM-enabled network device. Protocol stack 400 illustrates the lower protocol layers (e.g. network layer and below) represented in network protocol models such as the OSI network protocol stack, with the addition of a special sub-layer (also referred to as a "shim layer") for Ethernet OAM functions.

A network device, such as network device 106, may include protocol stack 400. A packet 422 from a network (e.g. networks 102 or 105 coupled to network device 106) that enters (i.e. an ingress packet) network device 106 through an ingress interface would traverse, in order, a physical layer (layer 1) 402 protocol processing, data link layer (layer 2) 404 processing, and OAM layer 408 (also referred to as a "shim layer") processing. OAM packets may be processed entirely at the OAM layer 408 and layers below. Other ingress packets (e.g. non-OAM packets), may be processed by network layer (layer 3) 410 and higher layers 412. In some embodiments, non-OAM packets may entirely bypass the OAM layer.

Packets that are to exit (e.g. egress packets) a network device are processed from higher to lower protocol layers. For example, packet 424 which may have been generated by an application on network device 106 or which may be handled by network device 106 to be forwarded, may begin processing at network layer 410 or above. Accordingly, many non-OAM packets may enter protocol processing at network layer 410 or higher layers 412. These egress packets, after being processed by network layer 410, proceed through link layer 404, and physical 402 layers before exiting the network device. OAM packets being transmitted from the network device enter protocol processing at OAM layer 408, and are processed through link 404, and physical 402 layers before exiting the device. Non-OAM packets may completely bypass OAM layer processing.

An OAM client 416 interacts with the OAM layer 408 to facilitate OAM processing. When an OAM packet is received by an OAM-enabled link layer, the packet is passed to the OAM client for processing. The packet may be discarded if received by a link layer that does not support OAM.

OAM client 416 may operate to provide fault management functions defined for an MEP in an Ethernet OAM-enabled network. MEPs periodically exchange CCM to detect loss of continuity or incorrect network connections. A CCM is multicast to each MEP in a MA at each administrative level. MEPs send loopback messages (LBM) to verify connectivity with another MEP or MIP for a specific MA. Loopback is a ping-like request/reply function. A MEP sends a loopback request message to another MEP or MIP, which generates a subsequent Loopback Reply (LRM). LBMs/LRMs are used to verify bidirectional connectivity. They are typically initiated by operator command. However, an MEP can be provisioned to send LBMs periodically. MEPs multicast Link Trace Messages (LTMs) on a particular MA to identify adjacency relationships with remote MEPs and MIPs at the same administrative level. LTM can also be used for fault isolation. The message body of an LTM includes a destination MAC address of a target MEP that terminates the link trace. When a MIP or MEP receives an LTM, it generates a unicast Link Trace Reply (LTR) to the initiating MEP. It also forwards the LTM to the target MEP destination MAC address. An LTM effectively traces the path to the target MEP.

When an MEP detects a connectivity failure at level N, for example, due to an absence of CCM from an MEP, it will multicast Alarm Indication Signals (AIS) in the direction away from the detected failure at the next most superior level to inform clients that a transport path and/or a service instance has failed.

Figure 4B:
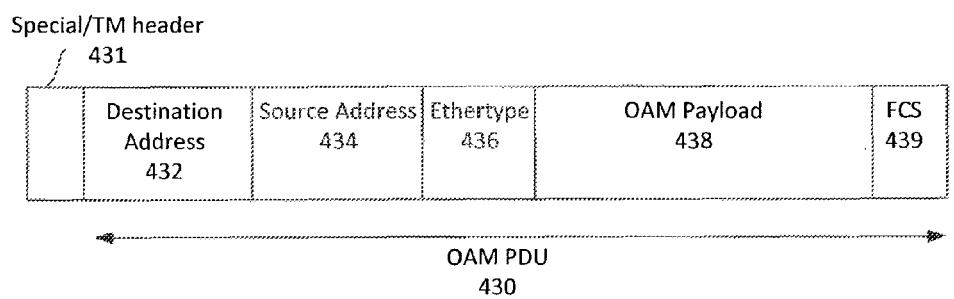
FIG. 4B illustrates a OAM protocol data unit format, in accordance with an embodiment.

FIG. 4B illustrates an OAM protocol data unit (PDU) 430, according to an embodiment. The OAM PDU can contain any of the OAM messages defined according to protocols, for example, such as IEEE 802.1ag. CCM is an exemplary OAM message that can be in the form of OAM PDU 430. OAM PDU 430 includes destination address 432, source address 434, Ethertype 436, OAM payload 438 and FCS 439 fields. The destination address 432 and source address 434 may be in the form of data link layer addresses such as Ethernet addresses. Ethertype indicates the type of payload. OAM payload 438 includes the OAM message content, such as, CCM, LBM, and the like. FCS 439 is a trailer and can include a frame check sequence.

According to an embodiment, a special header (e.g. traffic management header) 431 can be associated with OAM PDU 430. Special header 431 may be associated with the PDU as an attached header field as shown, or by being associated via a pointer. Special header 431 includes an indication to the ingress packet processing pipeline that the associated OAM PDU does not require farther packet processing, and only requires forwarding table lookup for the packet destination. Special header 431 includes a pointer to an entry in the forwarding table. Specifically, the pointer refers to the entry that corresponds to the destination MEP for the PDU.

Figure 4C:
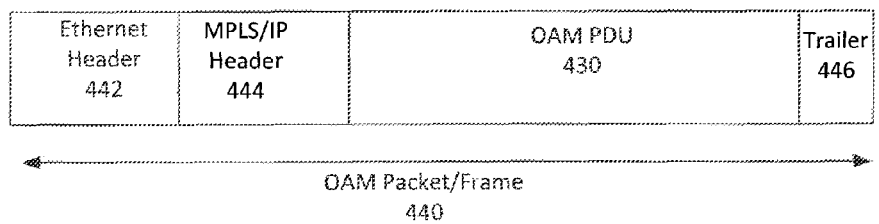
FIG. 4C illustrates a OAM protocol data unit format in accordance with an embodiment.

FIG. 4C illustrates an OAM packet (referred to herein interchangeably as an OAM frame) 440 in the form after Ethernet encapsulation. OAM PDU 430 is encapsulated by adding a MPLS/IP header 444 to form a MPLS/IP packet including the OAM PDU 430. The MPLS/IP packet is then again encapsulated by adding an Ethernet header 442, in order to be transmitted to the nexthop over an Ethernet WAN link. Herein, the term OAM packet is used to refer to a packet of the form shown in 440, and also an OAM PDU 430 encapsulated by adding MPLS/IP header 444. It should be noted that the MPLS/IP encapsulation is one of many encapsulations that can be used in embodiments.

Figure 5:
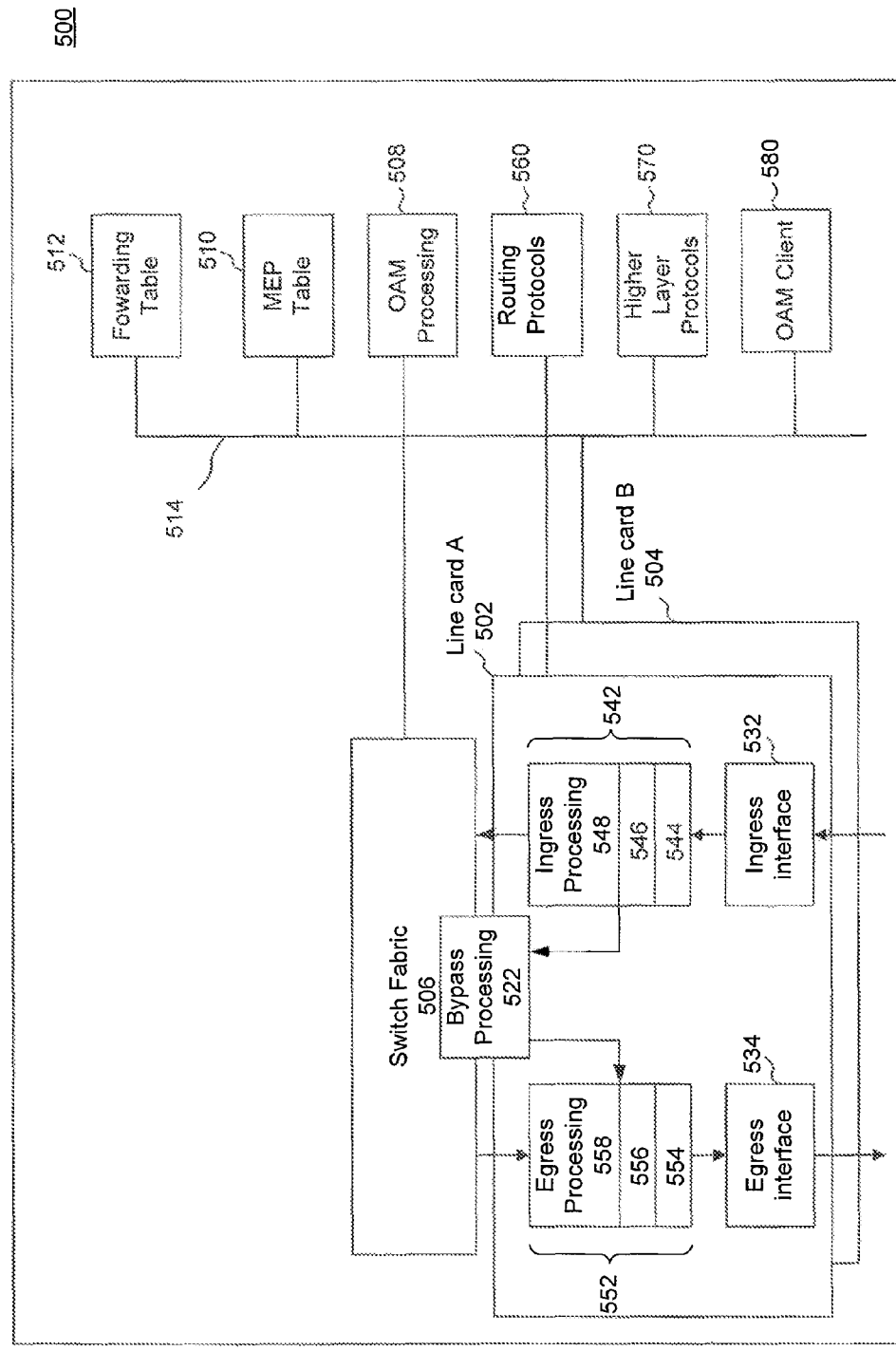
FIG. 5 illustrates a network device, in accordance with an embodiment.

FIG. 5 illustrates a network device 500, according to an embodiment. Network device 500 may be a router, bridge, switch, huh or other device which operates to forward data and control packets (or frames). Network device 500 may, in various embodiments, operate as a packet (or frame) forwarding device located in various network locations, such as, but not limited to, locations corresponding to packet forwarding devices 102, 104, 106, 108, 110 and 112, illustrated in FIG. 1.

In this disclosure, the terms "packet(s)" and "frame(s)" are used interchangeably with respect to embodiments unless specifically noted.

Network device 500 includes a plurality of line cards 502 and 504, a switch fabric 506, an OAM processing module 508, an MEP table 510, a forwarding table 512, routing protocol processing 560, higher layer protocol processing 570, OAM client 580, and an interconnection infrastructure 514. Interconnection infrastructure 514 provides interconnection among components of network device 500. Switch fabric 506 operates to transfer a packet between line cards.

Each line card 502 and 504 includes some or all of the logic to perform packet processing on ingress and egress packets. For example, ingress packets can enter network device 500 through ingress interface 532 and are processed in an ingress packet processing logic 542 (also referred to as "ingress packet processing pipeline"). Ingress packet processing logic 542 includes lower layer protocols 544 (e.g. physical and data link layers), an OAM processing shim layer 546, and higher layer protocols 548 (e.g. network layer and above).

An egress packet can enter line card 502 from switch fabric 506, and is subject to egress packet processing logic 552 (also referred to as "egress packet processing pipeline"). As discussed above, switch fabric 506 operates to transfer a packet between line cards. After completion of egress packet processing, the packet exits network device 500 through egress interface 534. Egress packet processing logic 552 can include higher layer protocols 558 (network and higher layers). OAM shim layer 556, and lower layer protocols 554 (e.g. data link and physical layers). The ingress packet processing 542 and egress packet processing 552, may employ a protocol stack such as protocol stack 400 described above. In an exemplary embodiment, ingress packet processing 542 and egress packet processing 552 implement the layers 1-3 shown in protocol stack 400, and the OAM shim layer. Line card 502 may also implement the OAM client 580, such as OAM client 416, in order to provide Ethernet OAM functionality to network device 500.

Network device 500 may include a bypass packet processing block 522. In an exemplary embodiment, upon encountering an indication (e.g. such as a special header in the packet) to bypass further packet processing, a packet in the ingress packet processing pipeline 542 can be processed in bypass packet processing block 522. Bypass packet processing block 522 may either completely bypass any ingress packet processing. In another embodiment, bypass packet processing block may access the forwarding table based upon the pointer to an entry of the forwarding table that is included in the special header of the packet. The packet then enters into egress packet processing. In an exemplary embodiment, an ingress packet from the OAM shim layer 546 or early in the processing of the network layer 548 may enter bypass processing 522. In the same embodiment, after accessing the forwarding table using the pointer included in the special header, the packet is entered into the egress processing pipeline 552 at the OAM shim layer 556 or later stages of egress network layer processing 558. Therefore, one or more layers of ingress and/or egress are bypassed for packets with the mentioned indication.

Network device 500 includes a forwarding table 512. Forwarding table 512 can include forwarding entries to destination nodes and networks reachable from network device 500. Each entry may include a destination, a nexthop, an egress interface, and protocol or encapsulation information for that egress interface. Forwarding table 512 is updated based upon routing protocols 560 implemented in network device 500. For example, when a topology change occurs in the network, an entry associated with a particular destination may be updated with a new nexthop and egress interface as determined by routing protocols 560.

At the network layer, a packet is processed based upon one or more of a source and a destination address, such as for example, a source Internet Protocol (IP) address and a destination IP address. For a packet being processed for egress from network device 500, forwarding table 512 includes information needed to identify a nexthop (e.g., a network device that is next in the path to the destination as indicated by the destination IP address) and the interface of network device 500 through which the packet is to be transmitted. One or more routing protocols 560, such as, but not limited to, BGP, OSPF or Routing Information Protocol (RIP), are used to maintain forwarding table 512. Because forwarding table 512 is updated by dynamic routing protocols, any changes to reachability of networks and/or other network devices from network device 500 are relatively quickly reflected in the forwarding table 512. As a result, routed packets that either originates from, or are forwarded by, network device 500 can quickly start using an alternative egress interface and/or nexthop to reach the respective destinations.

Higher layer protocols 570, such as, but not limited to, transport protocols and/or application layer protocols can be implemented in network device 500. Higher layer protocols can provide transport layer (e.g. Transmission Control Protocol (TCP), User Datagram Protocol (UDP)) and other services at layers higher than the network layer. Network management protocols, such as, Simple Network Management Protocol (SNMP).

OAM client 580, in association with ingress and egress packet processing logic, 542 and 552 respectively, and shim OAM layers 546 and 556 between link layer and network layer in the protocol processing logic, operates to provide Ethernet OAM functionality to network device 500. As described above, an OAM client such as OAM client 580 communicates with other Ethernet OAM entities in network devices to maintain associations known as MA. One of the functions, or protocols, performed by the OAM client is to periodically issue CCM messages (also referred to as "heartbeat messages").

When network device 500 includes OAM MEP functions, then network device 500 includes an MEP table 510. MEP table 510 includes information that may be configured or learned. MEP table 510 includes an entry for each of the other MEPs in a corresponding MA. OAM processing 508 and OAM client 580 operate to update the MEP table 510 based upon CCM received from other entities in the MA. For example, when a CCM is received from a peer MEP down entity, the egress interface and next hop to reach that peer MEP may be updated in an entry in the MEP table 510. According to an embodiment, OAM client 580 maintains one or more pointers to entries in the forwarding table 512 that correspond to MEPs listed in MEP table 510.

Figure 6:
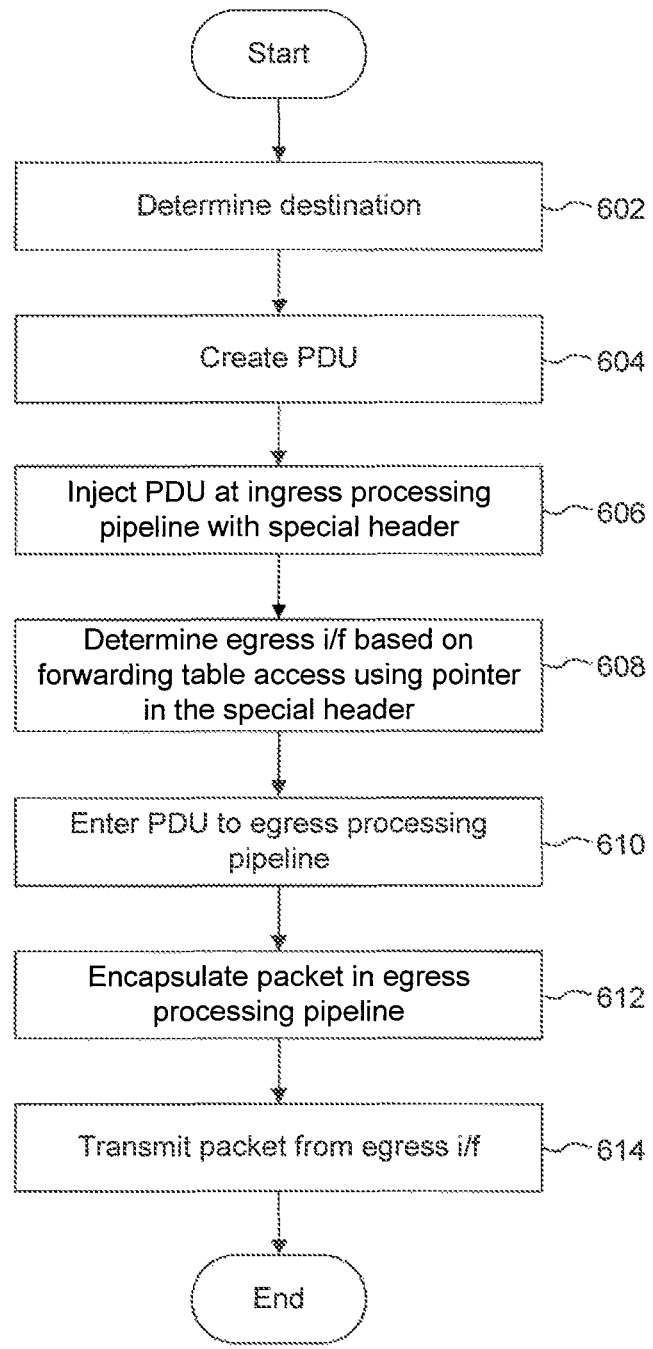
FIG. 6 illustrates a flowchart of a method to transmit an OAM packet in accordance with an embodiment.

FIG. 6 illustrates a flowchart of a method 600 to transmit a packet from a network device, in accordance with an embodiment. Method 600 operates to transmit packets generated at a network device at a protocol layer below the network layer in a manner that takes advantage of routing protocols that operate at the network layer.

In accordance with an embodiment, the packet transmitted is an Ethernet OAM packet. As described above, in an exemplary embodiment, the packet is an Ethernet OAM containing a CCM ("CCM packet"). The CCM packet is generated (e.g. originated) by the transmitting network device (e.g. network device 500). CCM packets are multicast to all MIPs and MEPs associated with a given MA. Use of a multicast address allows for discovery of remote MEP MAC addresses and the detection of network misconnections. A unicast MAC address may be used if the detection of misconnections is not required. A network device operating as an MEP transmits CCM packets on its associated Ethernet connections at a configured transmission rate.

As described above, in conventional network devices supporting Ethernet OAM, OAM packets to other MEPs are transmitted through the egress interface indicated in the MEP database. However, because the MEP database is updated based upon CCM received from peer MEPs, the MEP database may not be updated sufficiently quickly to reflect changes in network reachability to one or more peer MEPs. Therefore, relying upon the MEP database to select the egress interface for CCM packets can result in the network device transmitting CCM packets on already failed paths. Moreover, it may result in false alarms being generated signaling the failure of peer MEPs, based on faulty message paths that are being used.

Method 600, in contrast to the conventional techniques of transmitting locally-generated Ethernet OAM messages, is directed to select the egress interface using the forwarding table, thereby taking advantage of routing protocols that are more responsive to network reachability changes in order to select the best egress interface to reach each peer MEP for locally-generated packets injected below the network layer.

At step 602, the destination to which to send the CCM packet is determined. Each network device that is configured as an MEP, periodically transmits a CCM to every MEP known to it. The respective MEPs to which the network device transmits CCM may be determined based upon the MEP database.

The MEP database includes an entry for each MEP that is currently known to the network device. The MEP database is updated in accordance with CCMs received by the network device. As an MEP receives CCMs, it catalogues them in the MEP database indexed by a unique ID of the MEP, e.g. MEP ID. For example, if network device 500 receives a CCM message from another MEP A at particular OAM domain level, then the OAM client on the network device first determines if MEP A is already in the MEP database. If MEP is already in the database, then the entry may be updated to indicate the latest time of the last CCM at which it was confirmed that MEP A is alive and reachable. If no CCM frames from a peer MEP are received within a known interval (e.g. the interval may be based upon the CCM retransmission interval of the peer MEP), loss of continuity with that peer MEP is detected. In addition to loss of continuity, the exchange of CCMs between MEPs in a MA allows for the detection other defects.

At step 604, a protocol data unit (PDU) is generated for OAM message. According to an embodiment, the OAM PDU is a CCM PDU. Transmitted Ethernet OAM messages or OAM PDUs are of standard length, untagged Ethernet frames within the normal frame length limits in the range 64-1518 bytes. The PDU may include the destination MAC address, the source MAC address, an ethertype value, an OAM message portion, and a frame check sequence. The ethertype value is used to identify the message as an OAM message. The OAM message portion includes the CCM information.

As described above, CCM messages are one of several messages transmitted by a MEP entity in a network device, in accordance with embodiments. Other OAM messages include Loopback Message/Loopback Reply, Linktrace Message/Linktrace Reply, Alarm Indication Signal (AIS), and other messages that can be used for detecting conditions of the network connection between network devices.

At step 606, the locally-generated PDU is injected into an ingress processing pipeline in the network device. The PDU is injected into the ingress processing pipeline in order that it would be transmitted to the determined destination address.

According to the example embodiment, the PDU that is injected is an OAM CCM PDU. Other locally-generated OAM messages as well as non-OAM messages can be injected to the ingress processing pipeline in order to be transmitted to a determined destination, and are contemplated as embodiments. The injection of the PDU to the ingress processing pipeline may be performed by an OAM client. The injection may be to the OAM shim layer that is in between the network layer and link layer of a protocol processing stack. For example, OAM client 416 may inject a CCM PDU to OAM shim layer 408.

Injecting the PDU at the OAM shim layer may be accomplished in any of several techniques. When a PDU is injected at the shim layer in the ingress processing pipeline, it is intended that the packet would not be subjected to ingress processing at lower protocol layers than the layer at which it was injected (e.g. OAM shim layer below network layer). Specifically, by injecting the CCM packet at the shim layer, it avoids processing at layers 1-2 (e.g. 402 and 404, respectively, in FIG. 4a) to which any ingress packets that enter the network device from the network through the ingress interface would be subject to.

The OAM client may use an application programming interface (API) of the OAM shim layer to inject the packet. According to another embodiment, the generation of the PDU and injection of the PDU to the ingress processing pipeline may be hardcoded in the OAM shim layer.

According to an embodiment, the PDU is injected to the ingress processing pipeline along with a "special header" such as special header 431 illustrated in FIG. 4B. The special header includes a pointer to an entry in the forwarding table that corresponds to the destination of the PDU. The pointer to the corresponding entry in the forwarding table is determined by the OAM client, which may maintain a list of such corresponding pointers for one or more known MEPs. The special header operates as an indication to the ingress packet processing pipeline that the injected PDU is to be treated differently than other ingress packets. For example, in subsequent processing of the injected packet through the ingress processing pipeline, no packet processing (e.g. reassembly, other protocol processing etc.) other than forwarding table lookup using the pointer in the special header is required.

Unlike packets that have entered through the ingress interface, the injected PDU is already in an Ethernet packet format and does not have additional protocol headers encapsulating the PDU. Therefore, conventional ingress packet processing directed at recovering the PDU and placing it in an Ethernet format is unnecessary, and therefore can be bypassed. For example, whereas the injected PDU is in the form of an Ethernet packet when it is injected at the shim layer, ingress packets that enter the network device through an ingress interface from the network would have one of: an Internet Protocol (IP), Multi-Protocol Label Switching (MPLS), Virtual Private LAN Service (VPLS) or other header operating at a higher layer than the MAC layer, all of which need additional ingress processing. The special header injected with the CCM PDU is recognized by protocol logic in the network device as an indication to bypass packet processing in the ingress pipeline except for the forwarding table lookup based upon the pointer to an entry in the forwarding table included in the special header of the PDU. In some embodiments, a traffic management header, such as that used in MPLS may be used for the special header.

According to an embodiment, the CCM PDU is injected into the ingress processing pipeline at the interface (of the local network device) that is currently shown in the MEP database as being associated with the destination MEP. What is currently shown in the MEP database may be read at the time of selecting an MEP to which the OAM PDU is to be sent.

At step 608, the egress interface is identified based on the forwarding table entry referenced by the pointer in the special header of the PDU. The forwarding table is accessed based upon the pointer in the special header. In the example embodiment of transmitting an OAM CCM packet to a peer MEP, the destination address corresponds to an address of the peer MEP. As described above, the address or other identity of the destination MEP may be known from the local MEP database.

The forwarding table lookup yields the egress interface through which to transmit the packet to the destination MEP. The forwarding table lookup can also yield the nexthop along the path from the egress interface to the destination MEP, and any encapsulation that is required. For example, in addition to indicating the particular egress interface of the network device that is to be used, the corresponding entry in the forwarding table may also indicate the encapsulation that is to be used on the selected egress interface.

At step 610, the OAM PDU enters egress packet processing pipeline. According to the example embodiment, the OAM PDU enters the egress packet processing pipeline at the egress OAM shim layer or at the network layer layers 408 or 410 illustrated in FIG. 4). The OAM PDU enters the egress processing pipeline with information indicating the selected egress interface. According to an embodiment, the information indicating the selected egress interface includes the pointer to the corresponding entry or data structure in the forwarding table that was in the special header of the PDU when the PDU was injected to the ingress pipeline. At step 612, the egress processing pipeline encapsulates the OAM PDU by adding one or more headers. The forwarding table indicates the type of encapsulation required for packets exiting the selected egress interface. According to an embodiment, the encapsulation may be IP. In other embodiments, the encapsulation may include one or more of MPLS, VPLS, and the like.

At step 614, the encapsulated OAM CCM PDU is transmitted out of the egress interface. The encapsulated OAM CCM PDU is transmitted as an Ethernet packet.

Thus, method 600 provides for a locally-generated packet by a protocol entity at a protocol layer that occurs before the network layer, where the generated packet is injected into the ingress processing pipeline in order to be transmitted using the forwarding table of the network device. The egress interface is selected using the forwarding table, thereby enabling that the selection is responsive to any topology and/or reachability changes in the network. By transmitting a locally-generated OAM PDU (CCM, for example) using the forwarding table, the network device improves the chances that the CCM can reach the destination peer MEP over a valid path. This improves the reliability of CCM as a mechanism to monitor the status of non-adjacent OAM entities, reducing false alarms and providing that the actual path through which packets travel is being protected via the CCM mechanism.

The representative functions of the communications device described herein can be implemented in hardware, software, or some combination thereof. For instance, process 600 can be implemented using computer processors, computer logic, ASIC, FPGA, DSP, etc., as will be understood by those skilled in the arts based on the discussion given herein. Accordingly, any processor that performs the processing functions described herein is within the scope and spirit of the present disclosure. Moreover, instructions for process 600 can be encoded in any of a hardware description language, computer programming language, and can be stored in a disk, flash memory, or any other type of tangible computer readable medium.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for transmitting an operation and maintenance (OAM) packet from a source network device to a destination network device, comprising:
    generating an OAM protocol data unit (PDU) at the source network device;
    injecting the OAM PDU in an ingress packet processing pipeline, wherein the injected OAM PDU is associated with an indication to bypass at least a portion of ingress packet processing;
    determining an egress interface of the source network device through which to transmit the OAM PDU to the destination network device;
    encapsulating the OAM PDU in one or more protocol headers in an egress packet processing pipeline; and
    transmitting the encapsulated OAM PDU from the egress interface as the OAM packet.

2. The method of claim 1, wherein the injecting comprises injecting the OAM PDU to the ingress packet processing pipeline at an OAM protocol shim layer between a network layer and a data link layer.

3. The method of claim 1, wherein the determining an egress interface comprises:
    accessing a forwarding table based upon a pointer included in the indication to bypass at least a portion of ingress packet processing; and
    identifying the egress interface based upon the forwarding table.

4. The method of claim 3, wherein the forwarding table is updated based upon one or more routing protocols active in the source network device.

5. The method of claim 1, wherein the generating an OAM PDU comprises configuring the PDU as an OAM Continuity Check Message (CCM).

6. The method of claim 1, wherein the injecting comprises injecting the OAM PDU with a traffic management (TM) header, wherein portions of the ingress packet processing pipeline are configured to be bypassed for the OAM PDU.

7. The method of claim 1, wherein the injecting comprises injecting the OAM PDU in a first line card, and wherein the encapsulating is performed in the first line card.

8. The method of claim 7, wherein the transmitting comprises transmitting the encapsulated OAM PDU from the egress interface in the first line card.

9. The method of claim 1, wherein the destination network device and the source network device are members of an OAM maintenance association (MA).

10. The method of claim 9, wherein the destination network device and the source network device are each a maintenance endpoint (MEP) in the OAM MA, and wherein the OAM PDU is sent from an MEP down entity in the source network device to an MEP down entity in the destination network device.

11. A network device, comprising:
    an ingress interface configured to receive incoming packets from a network;
    an egress interface configured to transmit outgoing packets to the network;
    an ingress packet processing pipeline configured to process the incoming packets received from the ingress interface, wherein the ingress packet processing pipeline includes an ingress operation and maintenance (OAM) protocol shim layer between a data link layer and a network layer;

an OAM module configured to:
  generate an OAM protocol data unit (PDU) for an OAM packet; and
  inject the OAM PDU in the ingress packet processing pipeline, wherein the injected OAM PDU is associated with an indication to bypass at least a portion of ingress packet processing;
an egress packet processing pipeline configured to process the outgoing packets before the egress interface, wherein the egress packet processing pipeline is configured to:
  determine an egress interface of the network device through which to transmit the OAM PDU to a destination network device;
  encapsulate the OAM PDU in one or more protocol headers in the egress packet processing pipeline; and
  transmit the encapsulated OAM PDU from the egress interface as the OAM packet.

12. The network device of claim 11, wherein the OAM module is further configured to inject the OAM PDU to the ingress packet processing pipeline at the ingress OAM protocol shim layer.

13. The network device of claim 11, wherein the egress packet processing pipeline is further configured to:
  access a forwarding table based upon a pointer included in the indication to bypass at least a portion of ingress packet processing; and
  identify the egress interface based upon the forwarding table.

14. The network device of claim 11, wherein the OAM module is further configured to configure the OAM PDU as an OAM Continuity Cheek Message (CCM).

15. The network device of claim 11, wherein the OAM module is further configured to inject the OAM PDU in a first line card of the network device, and wherein the encapsulating is performed in the first line card.

16. The network device of claim 11, wherein the source network device is configured as a maintenance endpoint (MEP) in a maintenance association, and wherein the OAM PDU is sent from an MEP down entity in the source network device to an MEP down entity in the destination network device.

17. A non-transitory computer readable storage medium having instructions encoded therein, the instructions when executed by at least one processor in a source network device cause the source network device to execute a method for transmitting an operation and maintenance (OAM) packet from the source network device to a destination network device, the method comprising:
  generating a protocol data unit (PDU) for the OAM packet;
  injecting the generated OAM PDU in an ingress packet processing pipeline, wherein the injected OAM PDU is associated with an indication to bypass at least a portion of ingress packet processing;
  determining an egress interface of the source network device through which to transmit the OAM PDU to the destination network device;
  encapsulating the OAM PDU in a protocol header in an egress packet processing pipeline; and
  transmitting the encapsulated OAM PDU from the egress interface as the OAM packet.

18. The non-transitory computer readable storage medium of claim 17, wherein the injecting comprises injecting the OAM PDU in the ingress packet processing pipeline at an OAM protocol shim layer between a data link layer and a network layer.

19. The non-transitory computer readable storage medium of claim 17, wherein the determining an egress interface comprises:
  accessing a forwarding table based upon a pointer included in the indication to bypass at least a portion of ingress packet processing; and
  identifying the egress interface based upon the forwarding table.

20. The non-transitory computer readable storage medium of claim 17, wherein the destination network device and the source network device are each a maintenance endpoint (MEP) in the maintenance association (MA), and wherein the OAM PDU is sent from an MEP down entity in the source network device to an MEP down entity in the destination.

* * * * *